(12) United States Patent
Chen et al.

(10) Patent No.: US 8,369,084 B2
(45) Date of Patent: Feb. 5, 2013

(54) DUSTPROOF STRUCTURE FOR LAPTOP

(75) Inventors: Shun-Yi Chen, Taipei Hsien (TW);
Xiong Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 649 days.

(21) Appl. No.: 12/560,345

(22) Filed: Sep. 15, 2009

(65) Prior Publication Data
US 2011/0043995 A1 Feb. 24, 2011

(30) Foreign Application Priority Data
Aug. 18, 2009 (CN) .......................... 2009 1 0305757

(51) Int. Cl.
*H05K 5/00* (2006.01)
*H05K 7/00* (2006.01)
(52) U.S. Cl. .......... 361/679.55; 361/679.47; 361/679.49
(58) Field of Classification Search ............. 361/679.55, 361/679.49, 679.47
See application file for complete search history.

(56) References Cited

U.S. PATENT DOCUMENTS

| | | | |
|---|---|---|---|
| 6,229,701 B1* | 5/2001 | Kung et al. | 361/688 |
| 6,694,759 B1* | 2/2004 | Bash et al. | 62/180 |
| 7,347,058 B2* | 3/2008 | Malone et al. | 62/259.2 |
| 7,656,664 B2* | 2/2010 | Ye et al. | 361/695 |
| 7,871,319 B2* | 1/2011 | Tracy et al. | 454/184 |
| 8,055,392 B2* | 11/2011 | Kitamura et al. | 700/300 |

FOREIGN PATENT DOCUMENTS

| | | |
|---|---|---|
| CN | 2627255 Y | 7/2004 |
| CN | 2771925 Y | 4/2006 |
| CN | 1960617 A | 5/2007 |
| CN | 201084882 Y | 7/2008 |
| TW | 200601947 A | 1/2006 |

* cited by examiner

*Primary Examiner* — Anthony Haughton
(74) *Attorney, Agent, or Firm* — Altis Law Group, Inc.

(57) ABSTRACT

A dustproof structure for a laptop includes a gate, a motor and a controller. The laptop includes a shell having an air vent defined therein. The gate is movably mounted on the shell. The motor is mounted on the shell and connected to the gate. The controller is installed inside the laptop and configured for controlling the motor to drive the gate to open the air vent of the shell when the laptop is powered on, and to close the air vent of the shell when the laptop is being powered off.

5 Claims, 6 Drawing Sheets

DUSTPROOF STRUCTURE FOR LAPTOP

BACKGROUND

1. Technical Field

The disclosure relates to a dustproof structure, and more particularly, to a dustproof structure applied in a laptop.

2. Description of Related Art

Laptop computers (laptops) generate much heat when compared to other handheld devices, such as personal digital assistants. To dissipate the heat generated by the laptops, air vents are defined in the shell of the laptop. During use, air flows from the inside to the outside and vice versa to dissipate the heat. However, when the laptop is powered off or unused, dusts and other particles will enter into the laptop via the air vent and contaminate electrical elements inside the laptop.

Therefore, what is needed is to provide a dustproof for a laptop which can eliminate or at least ameliorate the problem above mentioned.

DETAILED DESCRIPTION

Figure 1:
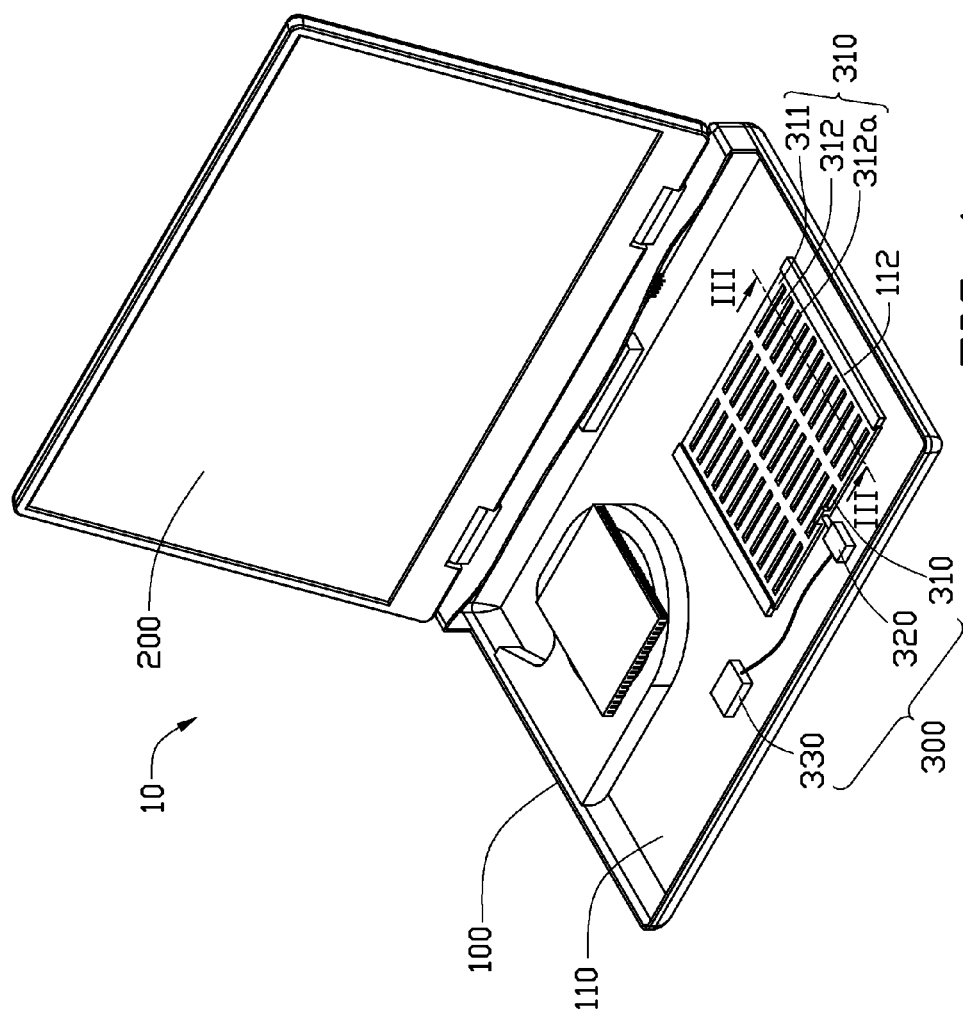
FIG. 1 is an isometric view of a dustproof structure applied in a laptop according to the first exemplary embodiment.
Figure 2:
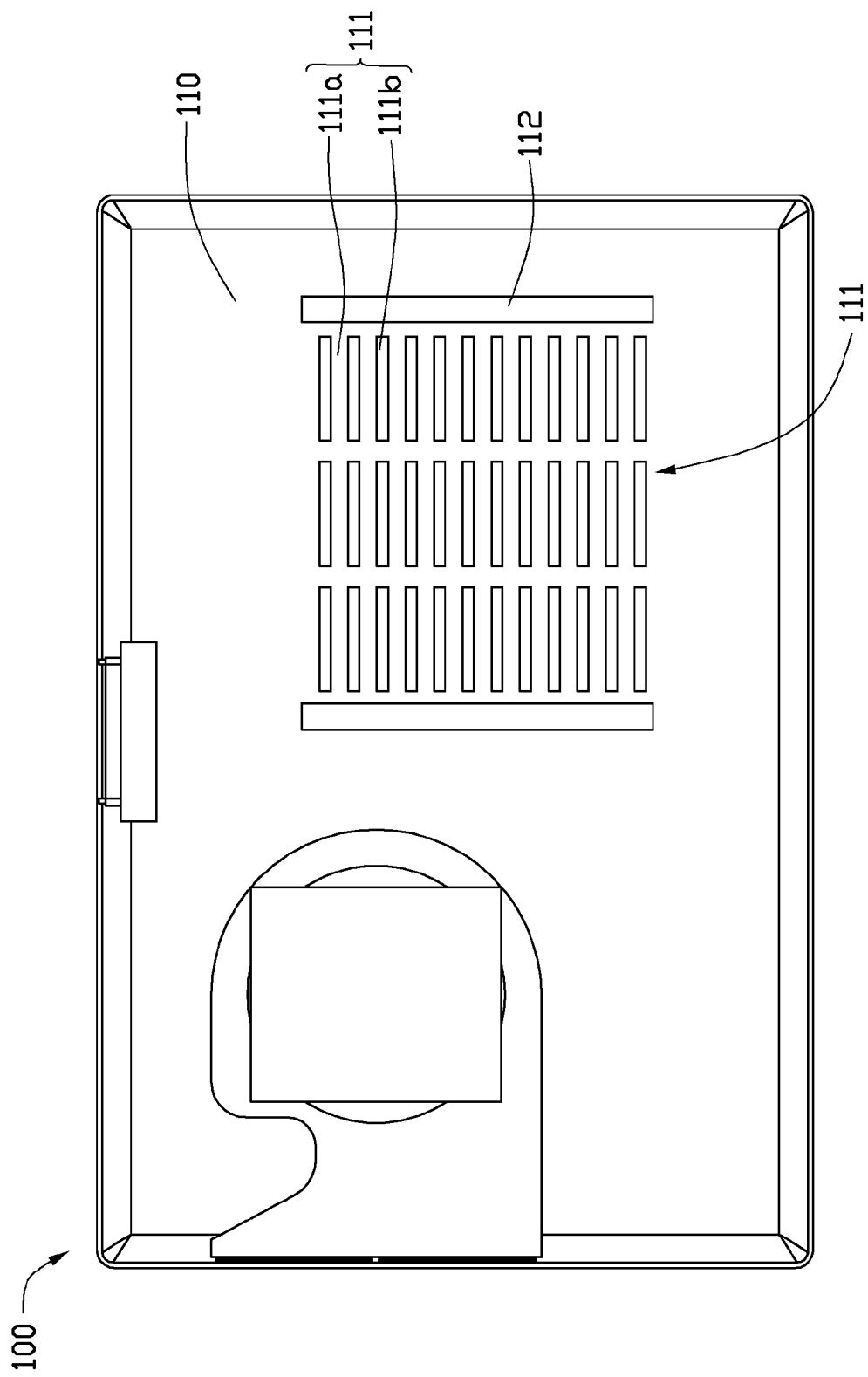
FIG. 2 is a top view of an inside bottom of a shell of the laptop shown in FIG. 1.

Referring to FIGS. 1 and 2, a dustproof structure 300 used in a laptop 10 according to a first exemplary embodiment is shown. The laptop 10 includes a main body 100 and a display 200. The dustproof structure 300 is installed in the main body 100 of the laptop 10 for preventing dusts and particles from entering the main body 100.

The main body 100 includes a shell 110. The shell 110 defines an air vent 111 therein as the entrance or exit for air, and includes a series of spaced apart fins 111a which are parallely arranged in the air vent 111 and define a series of first gaps 111b therebetween. The shell 100 further includes a pair of sliding guides 112 oppositely mounted on opposite edges of the air vent 111. The air vent 111 is rectangular shaped in this first exemplary embodiment. The heat generated by the laptop 10 is carried and dissipated out of the shell 110 by air flow passing through the first gaps 111b.

The dustproof 300 includes a rectangular grille-shaped gate 310, a motor 320 and a controller 330 which may be the central processing unit (CPU) of the laptop 10.

Figure 3:
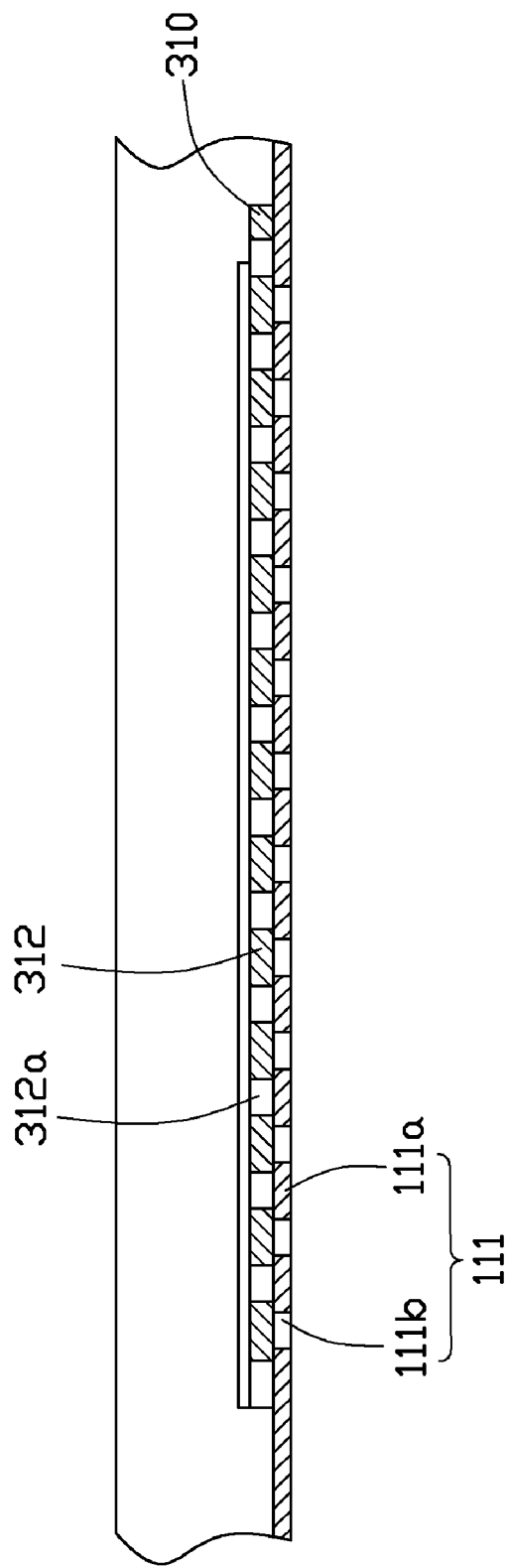
FIG. 3 is a cross section view of an air vent of the dustproof structure along III-III in FIG. 1 when the air vent is in a close state.
Figure 4:
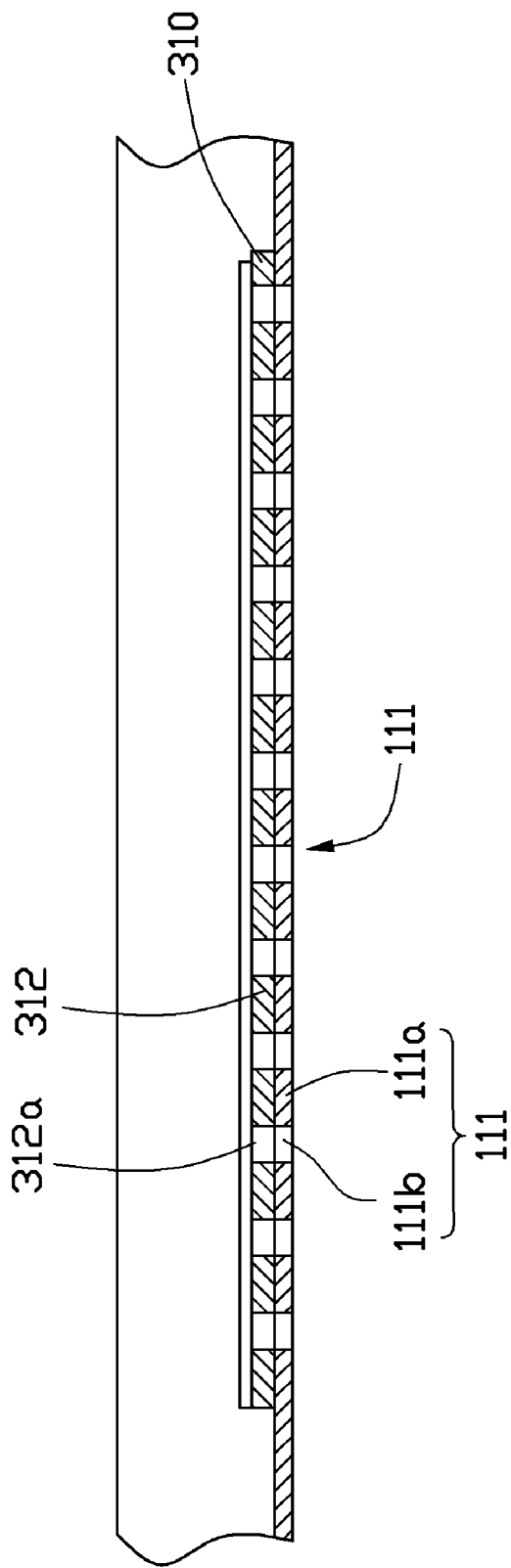
FIG. 4 is a cross section view of an air vent of the dustproof structure along III-III in FIG. 1 when the air vent is in an open state.

The gate 310 is slidably engaged with the sliding guides 112 at its two opposite edges, and covers the air vent 111 of the shell 110. The gate 310 includes a rectangular frame 311 and a series of spaced apart bars 312 parallely arranged in the frame 311. A series of second gaps 312a are defined among the bars 312 of the gate 310. The frame 311 is shaped similar to the air vent 111 of the shell 110 and larger than the air vent 111 in width and length thereby the frame 311 completely covers the air vent 111. A width of each bar 312 is wider than that of a corresponding first gap 111b. Referring to FIG. 3, when the laptop 10 is off, the bars 312 of the gate 310 is aligned with the first gaps 111b of the shell thereby sealing or shielding the first gaps 111b to prevent the electrical elements inside the laptop 10 from being contaminated by dusts and particles in the air. Referring to FIG. 4, when the laptop 10 is on, the bars 312 of the gate 310 is offset from the first gaps 111b thereby air can flow freely from the inside to the outside of the shell 110 and vice versa through the first and second gaps 111b, 312b to dissipate the heat or cool the inside the shell 110.

The motor 320 (see FIG. 1) is mounted on the shell 110 adjacent to the air vent 111, and connected to the gate 310 by an rotor thereof. The motor 320 is configured for driving the gate 310 to slide along the sliding guide 112 to close or open the air vent 111. In the first embodiment, the motor 320 is a step motor.

The controller 330 is electrically coupled to the motor 320 to control the motor 320. In use, when the laptop 10 is powered on, the controller 330 controls the motor 320 to move the gate 310, thereby opening the air vent 111 to dissipate heat in the shell 110. In contrast, when the laptop 10 is being powered down, the controller 330 controls the motor 320 to close the air vent 111 with the gate 310, thereby protecting the electronic element from being contaminated by dusts and particles in the air.

Figure 5:
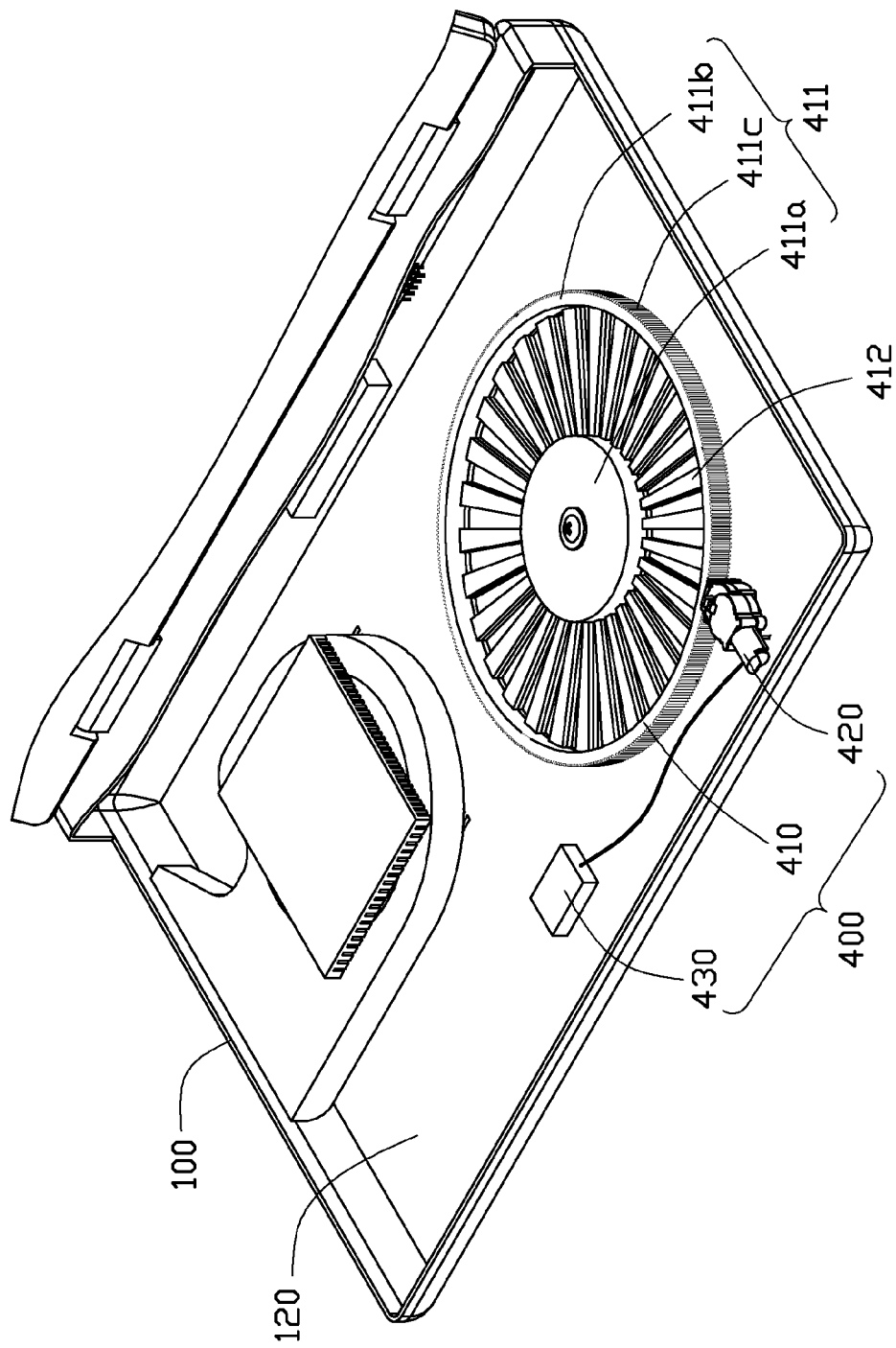
FIG. 5 is an isometric view of a dustproof structure applied in a laptop according to a second exemplary embodiment.
Figure 6:
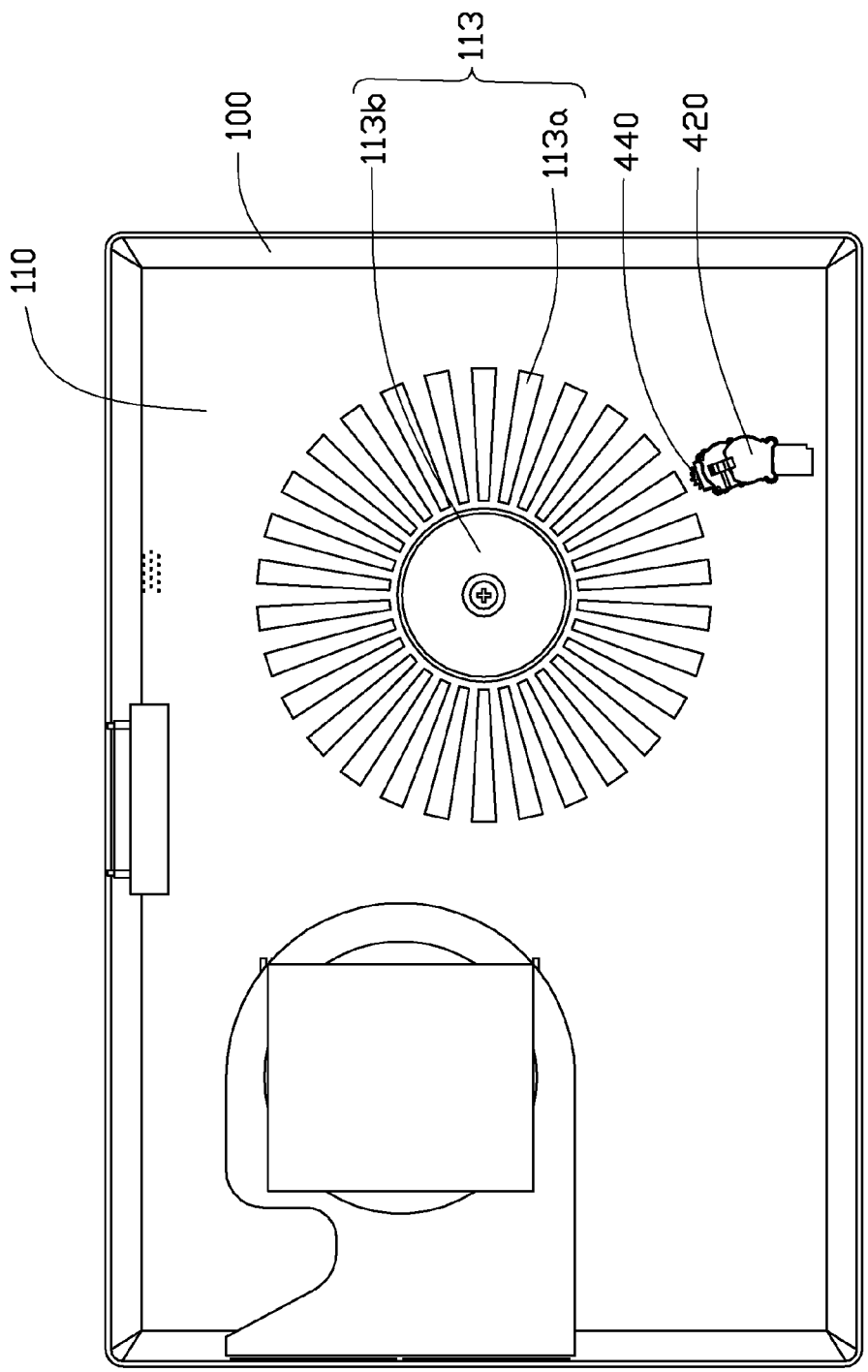
FIG. 6 is a top view of an inside bottom of a shell of the laptop shown in FIG. 5.

Referring to FIGS. 5 and 6, a dustproof structure 400 used in the laptop 10 according to a second exemplary embodiment is shown. The dustproof structure 400 includes a gate 410, a motor 420 and a controller 430. The motor 420 and the controller 430 in the second embodiment are similar to the motor 320 and the controller 330 in the first embodiment in their structures and functions. The difference between the dustproof structures 400 and 300 is described as follows.

Compared to the dustproof structure 300, the dustproof structure 400 further includes a driving gear 440. The gate 410 includes a circular-shaped frame 411 having a hub potion 411a and a coaxial rim portion 411b, and a number of bars 412 radially connected between the hub portion 411a and the rim portion 411b of the circular-shaped frame 411. The rim portion 411b includes a toothed outer circumference 411c that is meshed with the driving gear 440. Correspondingly, the shell 110 of the laptop 10 defines a series of spaced apart third gaps 113a radially arranged on the shell 110 around a center 113b. The gaps 113a cooperatively form an air vent 113 for air flowing freely from the inside to the outside of the shell 110. The gate 410 is pivotally coupled to the center 113b of the shell 110 by the hub portion 411a to align with the air vent 113. It is to be noted that a width of the bar 412 is wider than that of the third gaps 113a whereby the air vent 113 can be sealed or covered shielded by the gate 410.

The driving gear 440 is installed to the motor 420 and meshed with the toothed outer circumference 411c gate.

In use, when the laptop 10 is powered on, the controller 430 actuates the motor 420 to rotate the gate 410 to rotatably offset the bars 412 from the third gaps 113a, thereby opening the air vent and allowing the air exchanging through the air vent 113 to dissipate the heat or cool the inside the shell 110. When the laptop 10 is being powered off, the controller 430 actuates the motor 420 to rotate the gate 410 to recover the air vent 113, thereby prevent the electronic elements inside the laptop 10 from being contaminated by dusts and particles in the air.

In summary, the dustproof structure of present invention employs a gate to automatically close or open the air vent when the laptop 10 is off or on, thereby to prevent the laptop from being contaminated by dusts or particles in the air.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A dustproof structure for a laptop having a shell with an air vent defined therein, the dustproof structure comprising:
   a gate movably mounted on the shell, the gate comprising a circular-shaped frame comprising a hub portion and a rim portion;
   a motor mounted on the shell and connected to the gate;
   a driving gear installed on the motor, the rim portion comprising a toothed outer circumference meshed with the driving gear; and
   a controller installed inside the laptop and configured for controlling the motor to drive the gate to open the air vent of the shell when the laptop is powered on, and to close the air vent of the shell when the laptop is being powered off.

2. The dustproof structure for a laptop of claim 1, wherein the shell defines a series of spaced apart gaps radially arranged on the shell around a center; the third gaps cooperatively form the air vent.

3. The dustproof structure for a laptop of claim 2, wherein the gate is rotatably mounted on the center of the shell and comprises a plurality of bars radially formed on the gate.

4. The dustproof structure for a laptop of claim 3, wherein the bars are connected between the hub portion and rim portion of the circular shaped frame of the gate.

5. The dustproof structure for a laptop of claim 3, wherein a width of the bar is wider than that of the gaps.

* * * * *